(12) United States Patent
Jouper et al.

(10) Patent No.: US 8,089,181 B2
(45) Date of Patent: Jan. 3, 2012

(54) SYSTEM AND METHOD TO MEASURE LOAD TYPE AND EXCLUDE THE HUMAN BODY MODEL

(75) Inventors: Jeffrey A. Jouper, Renton, WA (US); John S. Lamb, Jr., Bothell, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 176 days.

(21) Appl. No.: 12/495,002

(22) Filed: Jun. 30, 2009

(65) Prior Publication Data

US 2010/0327663 A1 Dec. 30, 2010

(51) Int. Cl.
*H02J 1/00* (2006.01)
(52) U.S. Cl. .................................. 307/125; 307/326
(58) Field of Classification Search .................. 307/125, 307/326; 361/42, 86; 700/292, 293, 295; 702/64

See application file for complete search history.

(56) References Cited

U.S. PATENT DOCUMENTS

| 5,003,486 A | * | 3/1991 | Hendel et al. ................. 700/293 |
| 5,151,841 A | * | 9/1992 | Knights ........................... 361/86 |
| 2005/0286184 A1 | * | 12/2005 | Campolo ......................... 361/42 |

OTHER PUBLICATIONS

David Lohbeck, "Hazardous-voltage primer," EDN, May 11, 2006, p. 39; UBM, Waltham, MA.

* cited by examiner

*Primary Examiner* — Jared Fureman
*Assistant Examiner* — Daniel Cavallari
(74) *Attorney, Agent, or Firm* — Wiggin and Dana LLP

(57) ABSTRACT

A system and method for controlling connection of an electrical outlet to a power source so as to exclude the human body model. A first signal is generated and fed to the outlet through an outlet control device; feedback from a load at the outlet is detected. The load detector outputs a second signal to an outlet control device. The outlet is connected to the power source in accordance with the second signal. The outlet is not connected to the power source in the absence of a load, or if the detected load is consistent with the human body model.

20 Claims, 3 Drawing Sheets

SYSTEM AND METHOD TO MEASURE LOAD TYPE AND EXCLUDE THE HUMAN BODY MODEL

FIELD OF THE DISCLOSURE

This disclosure relates to electrical power distribution, and more particularly to devices for ensuring safety of electrical power outlets.

BACKGROUND OF THE DISCLOSURE

Safety standards have been developed for electrical outlets used in various applications, to control the delivery of power to an outlet and particularly to ensure that a human body cannot activate the outlet. (An outlet with a safety feature that shuts off power when a human body is detected is said to "exclude the human body model.") A typical safety standard requires that an isolated sense circuit be provided in the outlet unit to determine that a user device (e.g. an adapter) is plugged in, before enabling the output power. A conventional arrangement uses non-isolated feedback to detect when a device is plugged in, and performs continuous monitoring to ensure that the device remains installed in the outlet.

A number of conventional power outlet safety designs rely on contacts in the outlet to monitor whether a proper plug is installed. For example, one typical outlet has two plunger-actuated sense contacts to detect when a plug is installed. This requires sensing contacts and switches to actuate the output power. Such mechanical sensing and switching arrangements are inherently prone to failure over time.

Accordingly, it is desirable to implement a load detector/analyzer and control device for a power outlet that does not rely on switching or sensing devices within the outlet.

SUMMARY OF THE DISCLOSURE

According to a first aspect of the disclosure, a system for controlling connection of a power source to an outlet includes a signal generator for providing a first signal at the outlet; a detector including a current sensing device and a load detecting device; and an outlet control device. The current sensing device is coupled to the outlet and senses current at the outlet while the first signal is provided at the outlet. The load detecting device is coupled to the current sensing device, and detects an electrical load at the outlet in accordance with input from the current sensing device. The load detecting device outputs a second signal indicating presence of the load and indicating whether the load is consistent with the human body model. The outlet control device is coupled to the outlet, the detector, the signal generator and the power source, and connects the outlet to the power source in accordance with the second signal indicating presence of a load not consistent with the human body model. The outlet control device includes a trigger circuit coupled to the detector and a switching device; in an embodiment, the switching device is a relay. The trigger circuit is configured to receive the second signal, and to cause the switching device to connect the outlet to the power source in accordance with the second signal indicating presence of a load at the outlet not consistent with the human body model. The switching device may be configured to connect the outlet to the signal generator in the absence of a load at the outlet or in accordance with the second signal indicating presence of a load at the outlet consistent with the human body model.

According to another aspect of the disclosure, a method is provided for controlling connection of an electrical outlet to a power source so as to exclude the human body model. This method includes the steps of providing a first signal at the outlet; sensing current at the outlet while the first signal is provided at the outlet; detecting an electrical load at the outlet in accordance with the sensed current; outputting a second signal indicating presence of the load and indicating whether the load is consistent with the human body model; and connecting the outlet to the power source in accordance with the second signal indicating presence of a load not consistent with the human body model. The connecting step may also include receiving the second signal from the trigger circuit to cause the switching device to connect the outlet to the power source, in accordance with the second signal indicating presence of a load at the outlet not consistent with the human body model.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
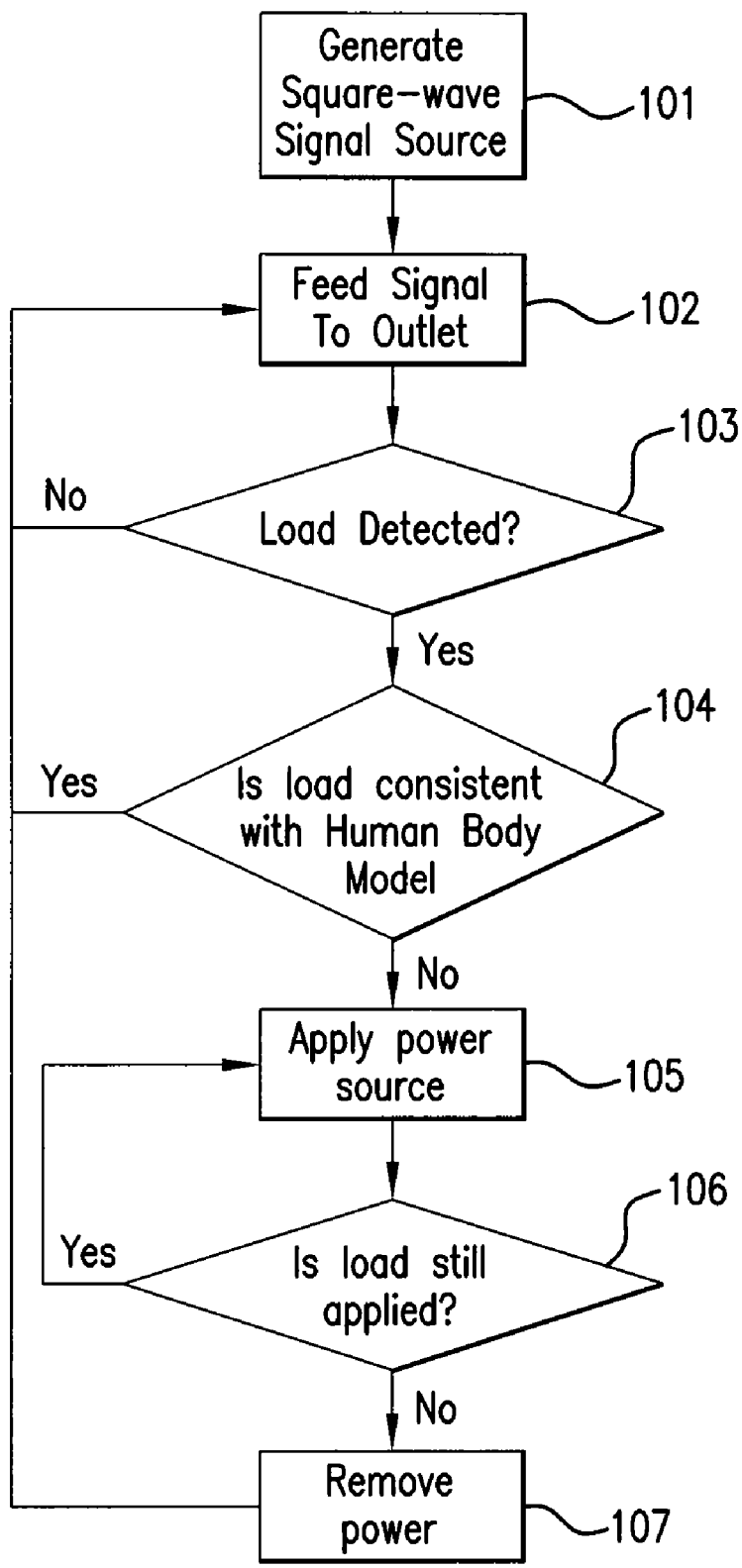
FIG. 1 is a flowchart showing steps in a method for detecting and analyzing a load at an outlet to exclude the human body model, in accordance with an embodiment of the disclosure.

In accordance with an embodiment of the disclosure, a procedure to control power availability to an electrical outlet, and ensure that the human body cannot activate the outlet, is shown in the flowchart of FIG. 1. A signal generator device outputs a low energy, non-harmful, square-wave signal (step 101) which is fed to the electrical outlet through an outlet control device (step 102). At this point the outlet is connected not to the power source, but to a detector including a current sensing circuit and a load detecting circuit. The current sensing circuit senses feedback from the load and inputs that feedback to the load detecting circuit. When a load is detected (step 103), the detector then determines whether the load is consistent with the human body model (step 104). If an appropriate load is present, the power source is applied to the outlet (step 105). The connection between the power source and the outlet is maintained while the load is applied (step 106); the power connection is removed (step 107) if the load is no longer detected. If the load is not appropriate (e.g. the load is consistent with the human body model), then the outlet remains isolated from the power source, the square-wave signal generator continues to be connected to the outlet, and the current sensing circuit continues to supply feedback to the load detecting circuit.

The human body model is characterized by ranges of the resistance and capacitance of human skin. The resistance of human skin is typically in the range of 1 kΩ (for wet skin) to 500 kΩ (for very dry skin). The capacitance of human skin is generally at or below 0.03 μF. To exclude the human body, the signal generator must be set to a low frequency so as not to trigger through the capacitance of human skin, and a low voltage amplitude so as not to trigger through the resistance of human skin. Loads that are appropriate for activating the outlet, by contrast, typically have resistance below about 20Ω while having capacitance above 1.0 μF. The wide range between the human body model and the load model permits the detector to discriminate between the two, and activate only with the load model while excluding the human body model.

Figure 2:
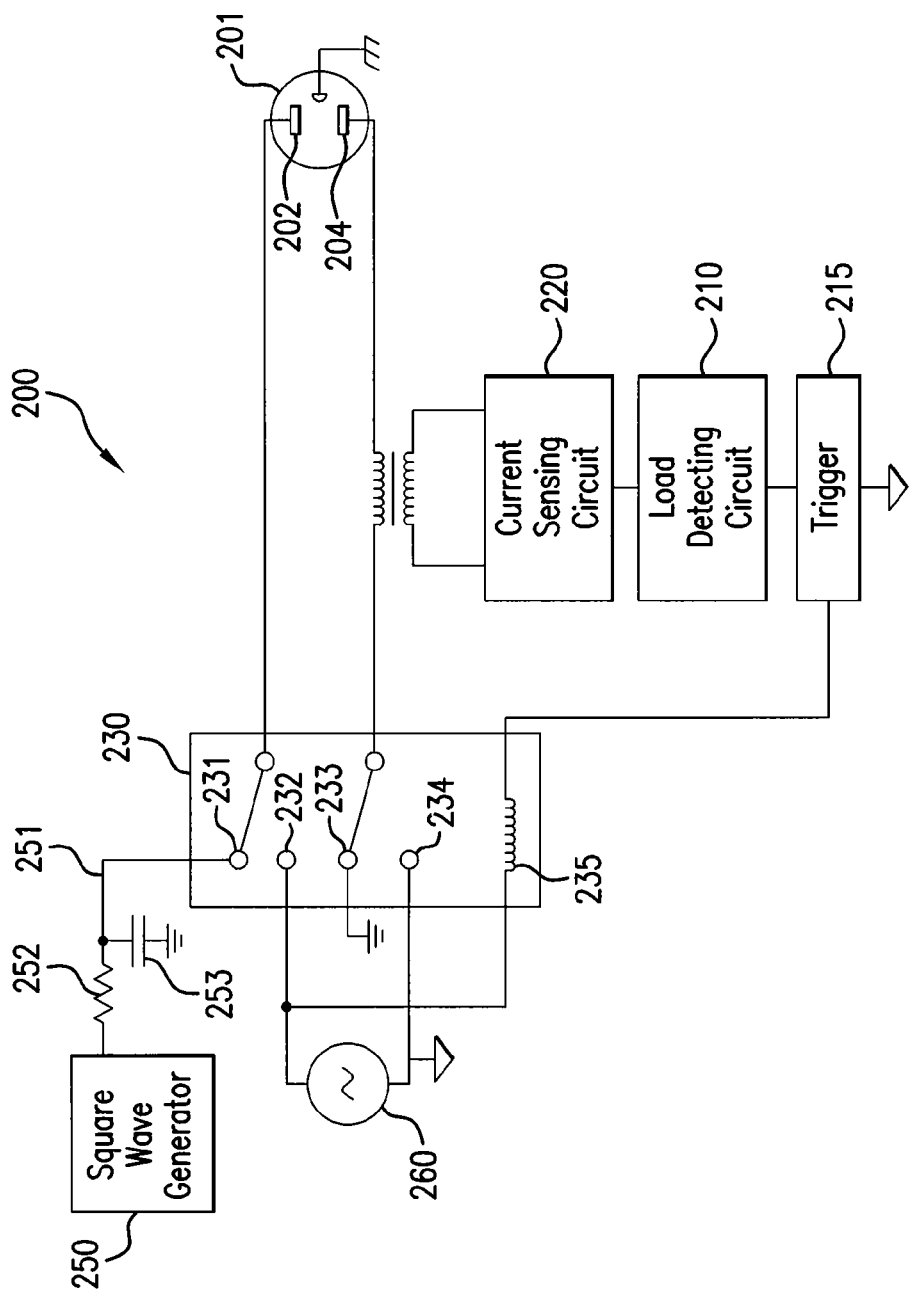
FIG. 2 is a schematic block diagram of an electrical outlet and power source with a load detecting circuit, a current sensing circuit and an outlet control device, in accordance with an embodiment of the disclosure.

A system 200 for detecting loads at an outlet 201, and applying a power source when the load is not consistent with the human body model, is shown in the block diagram of FIG. 2. System 200 includes a current sensing circuit 220, a load detecting circuit 210 and an outlet control device; in this embodiment, the outlet control device includes a relay 230 connected to a square wave generator 250. The outlet control device controls connection of the outlet 201 to the power source 260 (typically 110 VAC), according to the characteristics of the load at the outlet.

Before the outlet is connected to the power source, the terminals 202, 204 of the outlet are switched to contacts 231, 233 of the relay respectively. Contact 231 is connected to a signal output 251 of square wave generator 250, which outputs a square wave at a low frequency (e.g. in the range 10 Hz to 300 Hz) to be used as a source for detecting a load at the outlet. The square-wave peak voltage is in the "safety extra-low voltage" or "user-touchable" range (that is, less than about 40 V), as understood by those skilled in the art. The system therefore can detect a human touch at the outlet without causing harm. The RC combination of resistor 252 and capacitor 253 forms a filter which serves to limit the rise/fall time of the square wave.

The low-frequency, low-voltage square wave signal is fed to the outlet 201 through contact 231. Terminal 204 of the outlet is coupled to current sensing circuit 220 to measure the amount of feedback signal, thereby determining whether a load has been connected to the outlet. Current sensing circuit 220 is coupled to load detecting circuit 210, which provides input to a trigger device 215. When a load is detected, and that load is not consistent with the human body model, load detecting circuit 210 activates trigger circuit 215, which completes a conducting path through coil 235 of relay 230. Current in coil 235 then energizes relay 230, which switches power source 260 to outlet 201 through contacts 232, 234. Power from power source 260 will continue to be delivered to outlet 201 as long as an appropriate load is present.

It will be appreciated that system 200 is external to power outlet 201, and does not require any switching or sensing elements within the outlet. System 200 responds to appropriate loads, distinguishes between a proper electrical load and an incorrect load such as a human body, and excludes the human body model from connection with the outlet. This reduces the number of conductors from the power source to the outlet (thereby reducing system weight and complexity), and maintains personal safety by not having power applied to the electrical outlet when not in use. This feature is particularly desirable for electrical outlets in locations with high exposure to children.

Figure 3:
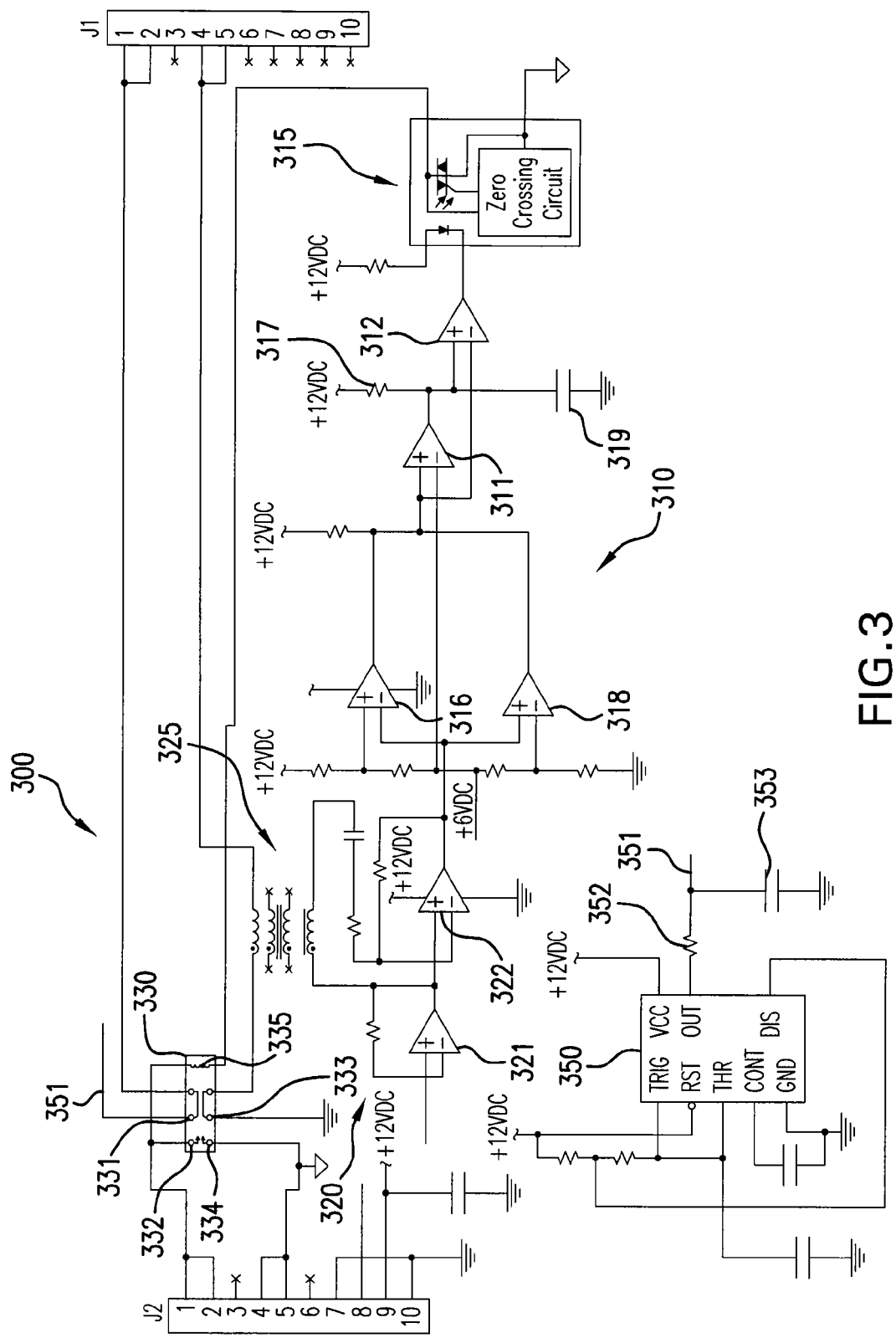
FIG. 3 is a circuit diagram for a system to measure a load type and exclude the human body model, in accordance with an embodiment of the disclosure.

A system 300 according to a particular embodiment of the disclosure is shown schematically in FIG. 3. A timing circuit (e.g. LMC555CM NOPB from National Semiconductor Corporation) and the components connected directly thereto form a square wave generator 350 providing a low-frequency, low-voltage (12 VDC peak) signal for determining the type of load at the outlet. The square wave generator has an output connected to resistor 352 and capacitor 353 which form a filter; the low voltage of 12 VDC and the filter (352, 353) limit the peak current to 1.2 mA, and the low frequency limits the AC current to 900 μA. The filter (352, 353) provides a rise and fall time modification of the generator signal limiting the frequency of the square-wave edge to 400 Hz and limiting the current to 1.2 mA peak.

The output signal 351 from the generator and filter is connected to the outlet through the normally closed contacts 331, 333 of the control relay 330 (e.g. RTD14012F from Tyco Electronics Corporation).

The low level signal of the generator is then sensed through the coil 325. This signal is amplified by current-to-voltage converter amplifier 322 in circuit 320. Amplifier 321, the output of which is connected to an input of amplifier 322, provides a mid-point bias at approximately 6 V. This is done to center the quiescent voltage of amplifier 322 between the upper and lower voltage thresholds of 9 V and 3 V respectively. The pick-up coil has a turns ratio of 100:1. For a current of 600 μA, a sensed current of 6 μA is fed to the amplifier stage. With the high gain of the current to voltage converter amplifier, the 6 μA becomes a 2.0 Volt signal. The threshold of +/−3 V about the center voltage of 6 V requires a signal of at least 900 μA. This is 1.5 times greater than the typical human body model.

When the load sense current is in excess of the required amount to cause an amplifier output swing greater than the +/−3 V thresholds, comparators 316, 318 in circuit 310 are triggered. The outputs of these comparators are connected to amplifier 311 in the next stage of comparison to generate a control signal to relay 330. The output of this comparator triggers a timer circuit which includes resistor 317 and capacitor 319. This timer holds the relay coil 335 in an ON condition continuously as long as the threshold is exceeded by the load current signal. In the ON condition, coil 335 is caused to conduct current and thereby close contacts 332, 334 of relay 330, so that the outlet is connected to the power source. If the load current signal decreases below the threshold or if the load is removed, the timer will expire and release the relay drive through amplifier 312, so that coil 335 is in an OFF condition. In the OFF condition, coil 335 does not conduct current, so that contacts 332, 334 are open, the outlet is disconnected from the power source, and output signal 351 from the generator and filter is connected to the outlet through the normally closed contacts 331, 333. The opto-coupler 315 provides an isolated interface to the relay coil.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

We claim:

1. A system for controlling connection of a power source to an outlet, comprising:
   a signal generator for providing a first signal at the outlet, the first signal being an oscillating signal having a frequency of at least 10 Hz;
   a detector including
      a current sensing device, coupled to the outlet, for sensing current at the outlet while the first signal is provided at the outlet, and a load detecting device, coupled to the current sensing device, for detecting an electrical load at the outlet in accordance with input from the current sensing device, and for outputting a second signal indicating presence of the load and indicating whether the load is consistent with the human body model; and an outlet control device, coupled to the outlet, the detector, the signal generator and the power source, for connecting the outlet to the power source in accordance with the second signal indicating presence of a load not consistent with the human body model.

2. A system according to claim 1, wherein the outlet control device includes a trigger circuit coupled to the detector, and a switching device coupled to the trigger circuit, the outlet, the signal generator and the power source, wherein the trigger circuit is configured to receive the second signal and to cause the switching device to connect the outlet to the power source in accordance with the second signal indicating presence of a load at the outlet not consistent with the human body model.

3. A system according to claim 2, wherein the switching device connects the outlet to the signal generator in the absence of a load at the outlet or in accordance with the second signal indicating presence of a load at the outlet consistent with the human body model.

4. A system according to claim 1, wherein the first signal is a square wave output by the signal generator to the outlet via the outlet control device.

5. A system according to claim 4, wherein the square wave is characterized by a rise/fall time, and further comprising an RC circuit coupled to the signal generator to limit the rise/fall time of the square wave.

6. A system according to claim 4, wherein the square wave has a frequency in the range of 10 Hz to 300 Hz.

7. A system according to claim 4, wherein the first signal has a peak voltage less than about 40 V.

8. A system according to claim 2, wherein the switching device comprises a relay including a coil, and the trigger circuit is effective to connect the coil to the power source in accordance with the second signal indicating presence of a load at the outlet not consistent with the human body model, thereby providing current in the coil to energize the relay.

9. A system according to claim 8, wherein in the absence of a load at the outlet or in accordance with the second signal indicating presence of a load at the outlet consistent with the human body model, the relay is not energized, so that the outlet is connected to the signal generator.

10. A system according to claim 2, wherein the trigger circuit comprises an opto-coupler.

11. A method for controlling connection of a power source to an outlet, the method comprising the steps of:

providing a first signal at the outlet, the first signal being an oscillating signal having a frequency of at least 10 Hz;

sensing current at the outlet while the first signal is provided at the outlet;

detecting an electrical load at the outlet in accordance with the sensed current;

outputting a second signal indicating presence of the load and indicating whether the load is consistent with the human body model; and connecting the outlet to the power source in accordance with the second signal indicating presence of a load not consistent with the human body model.

12. A method according to claim 11, wherein the first signal is provided using a signal generator, and further comprising:

providing a trigger circuit and a switching device coupled to the trigger circuit, the outlet, the signal generator and the power source.

13. A method according to claim 12, wherein the connecting step further comprises:

receiving the second signal from the trigger circuit to cause the switching device to connect the outlet to the power source, in accordance with the second signal indicating presence of a load at the outlet not consistent with the human body model.

14. A method according to claim 12, wherein the switching device connects the outlet to the signal generator in the absence of a load at the outlet or in accordance with the second signal indicating presence of a load at the outlet consistent with the human body model.

15. A method according to claim 12, wherein the first signal is a square wave output by the signal generator to the outlet via the switching device.

16. A method according to claim 15, wherein the square wave is characterized by a rise/fall time, and further comprising the step of providing an RC circuit coupled to the signal generator to limit the rise/fall time of the square wave.

17. A method according to claim 15, wherein the square wave has a frequency in the range of 10 Hz to 300 Hz.

18. A method according to claim 15, wherein the first signal has a peak voltage less than about 40 V.

19. A method according to claim 12, wherein the switching device comprises a relay including a coil, and the trigger circuit is effective to connect the coil to the power source in accordance with the second signal indicating presence of a load at the outlet not consistent with the human body model, thereby providing current in the coil to energize the relay.

20. A method according to claim 19, wherein in the absence of a load at the outlet or in accordance with the second signal indicating presence of a load at the outlet consistent with the human body model, the relay is not energized, so that the outlet is connected to the signal generator.

* * * * *